United States Patent
Linder et al.

(10) Patent No.: US 7,970,036 B2
(45) Date of Patent: Jun. 28, 2011

(54) ORGANIC SEMICONDUCTOR LASER AND METHOD FOR PRODUCING IT

(75) Inventors: Norbert Linder, Lappersdorf (DE); Martin Reufer, Rohrbach (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 323 days.

(21) Appl. No.: 12/011,437

(22) Filed: Jan. 25, 2008

(65) Prior Publication Data

US 2008/0187017 A1  Aug. 7, 2008

(30) Foreign Application Priority Data

Jan. 25, 2007 (DE) .......................... 10 2007 003 856
Mar. 7, 2007 (DE) .......................... 10 2007 011 124

(51) Int. Cl.
*H01S 5/00* (2006.01)

(52) U.S. Cl. ............... 372/50.124; 372/50.1; 372/50.11; 372/50.121

(58) Field of Classification Search ............ 372/50.1, 372/50, 124, 50.11, 50.121
See application file for complete search history.

(56) References Cited

U.S. PATENT DOCUMENTS

| | | | |
|---|---|---|---|
| 3,969,686 A * | 7/1976 | Scifres et al. | 372/96 |
| 5,337,328 A * | 8/1994 | Lang et al. | 372/45.01 |
| 5,796,771 A | 8/1998 | DenBaars et al. | |
| 5,881,089 A | 3/1999 | Berggren et al. | |
| 6,330,262 B1 | 12/2001 | Burrows et al. | |
| 2002/0171088 A1 * | 11/2002 | Kahen et al. | 257/88 |
| 2004/0004988 A1 * | 1/2004 | Cok et al. | 372/70 |
| 2004/0076204 A1 | 4/2004 | Kruschwitz et al. | |
| 2005/0062903 A1 * | 3/2005 | Cok et al. | 349/69 |
| 2008/0089379 A1 | 4/2008 | Philippens | |
| 2008/0138013 A1 * | 6/2008 | Parriaux | 385/37 |

FOREIGN PATENT DOCUMENTS

| | | |
|---|---|---|
| DE | 198 05 993 | 7/1999 |
| DE | 100 64 448 | 7/2002 |
| DE | 101 62 783 | 7/2003 |
| EP | 1 035 623 | 9/1998 |
| EP | 1 249 903 A2 | 10/2002 |
| EP | 1 411 608 A2 | 4/2004 |
| EP | 1 503 469 A2 | 2/2005 |
| EP | 1 906 497 A1 | 4/2008 |
| WO | WO 2006/131087 | 12/2006 |

OTHER PUBLICATIONS

A. Haugeneder et al., "Nonlinear emission and recombination in conjugated polymer waveguides", Journal of Applied Physics, vol. 85, No. 2, pp. 1124-1130, Jan. 15, 1999.

C. Kallinger et al., "A flexible conjugated polymer laser", Advanced Materials, vol. 10, No. 12, pp. 920-923, 1998.

D. Schneider et al., "An unltraviolet organic thin-film solid-state laser for biomarker applications", Advanced Materials, vol. 17, No. 1, pp. 31-34, 2005.

(Continued)

*Primary Examiner* — Kinam Park

(74) *Attorney, Agent, or Firm* — Cohen Pontani Lieberman & Pavane LLP

(57) ABSTRACT

An organic semiconductor laser, which is produced integrally with an electrically operable inorganic LED (1), and also the method for producing said laser.

16 Claims, 1 Drawing Sheet

OTHER PUBLICATIONS

M. Reufer et al., "Amplified spontaneous emission in an organic semiconductor multilayer waveguide structure including a highly conductive transparent electrode", Applied Physics Letters, vol. 86, pp. 22110-1-3, 2005.

S. Riechel et al., "A nearly diffraction limited surface emitting conjugated polymer laser utilizing a two-dimensional photonic band structure", Applied Physics Letters, vol. 77, No. 15, pp. 2310-2312, Oct. 9, 2000.

Search Report dated Jun. 9, 2008 issued for the counterpart European Application No. EP 08 15 0667 (10 pages).

T. Riedl et al.: "Tunable organic thin-film laser pumped by an inorganic violet diode laser", Appl. Phys. Lett. AIP, American Institute of Physics, Melville, NY, Bd. (pp. 1-3), Nr. 24, Jul. 15, 2006, XP012082096 (3 pages).

McGehee, M. D. et al., "Semiconducting polymer distributed feedback lasers", Appli. Phys. Lett., vol. 72, No. 13, Mar. 30, 1998, pp. 1536-1538.

S. Riechel et al., "Very compact tunable solid-state laser utilizing a thin-film organic semiconductor", Optics Letters, vol. 26, No. 9, pp. 593-595, May 1, 2001.

* cited by examiner

ORGANIC SEMICONDUCTOR LASER AND METHOD FOR PRODUCING IT

RELATED APPLICATIONS

This patent application claims the priority of German patent application nos. 10 2007 003 856.0 filed Jan. 25, 2007 and 10 2007 011 124.1 filed Mar. 7, 2007, the disclosure content of both of which is hereby incorporated by reference.

FIELD OF THE INVENTION

The invention relates to an organic semiconductor laser comprising a layer composed of organically laser-active material and a laser resonator.

BACKGROUND OF THE INVENTION

Organic semiconductors can be used very simply and cost-effectively as active material in spectrally tunable lasers. In general, polymers and small molecules are used as organically active material. With optical excitation by means of suitable external laser sources, laser operation in the entire visible spectral range is thus possible. It has not been possible hitherto to demonstrate a direct electrical driving of organic semiconductors, on account of the low charge carrier mobility and the resultant absorption in charged semiconductor films. Hitherto the laser excitation has always been effected by means of expensive external laser sources that take up a large amount of space.

SUMMARY OF THE INVENTION

One object of the invention is to excite an organic semiconductor laser without the expensive external laser sources that take up space. Another object is to provide a method for producing an organic semiconductor laser of this type.

In accordance with at least one embodiment of the organic semiconductor laser, the organic semiconductor laser comprises at least one layer composed of organically laser-active material and a laser resonator, wherein an optical pump source is integrally connected to the organic semiconductor laser.

In other words, the pump source is monolithically connected to the organic semiconductor laser. That is to say that pump source and organic semiconductor laser are preferably fixedly connected to one another and form a unit.

In accordance with at least one embodiment of the organic semiconductor laser, the optical pump source consists of or comprises an electrically excited inorganic LED (light emitting device). The direct monolithic coupling of the organic laser to the excitation source makes it possible to avoid the costs for the previous optical pump sources. This organic semiconductor laser is preferably produced as an extension of the previous chip process used for producing an inorganic LED. The pump source can either comprise precisely one inorganic LED or else also comprise a plurality—for example at least two—of inorganic LEDs. The LED can also be the LED semiconductor chip. That is to say the LED semiconductor chip can be integrally connected to the organic semiconductor laser.

In accordance with one preferred embodiment, the laser resonator is formed by patterning a surface of the organic laser-active material.

A so-called DFB—distributed feedback—resonator can thus be produced by the targeted patterning of the surface of the laser-active material.

The formation of the patterned surface for forming a DFB resonator can be formed at the top side or else at the underside for a laser emission perpendicular to the surface and also laterally for a laser emission laterally with respect to the surface, that is to say an edge emission.

In accordance with a further advantageous development, the organic laser-active material is separated from the inorganic LED by a radiation-transmissive separation layer. In this case, the separation layer is transmissive at least for part of the pump radiation generated by the inorganic LED. Preferably, the separation layer is transparent to the pump radiation generated in the inorganic LED.

The separation layer enables a substantially lossless or a lossless coupling of the photons from the inorganic LED into the active organic material.

When a transparent separation layer is used, the laser resonator can then also be formed at the interface layer between the transparent separation layer and the organically laser-active material.

In accordance with a further advantageous development, the surface of the inorganic LED is formed in roughened fashion. This roughening of the surface of the inorganic LED increases the external efficiency of these inorganic LEDs. In this case it is also favorable to simultaneously use the separation layer as a planarization layer. That is to say that besides its optical properties, the separation layer then also serves for planarizing and/or smoothing the for example roughened surface of the inorganic LED.

The planarization layer is advantageously applied by coating processes such as spin-coating or blade coating.

In accordance with a further embodiment of the invention, the surface of the inorganic LED is formed in the form of a photonic crystal. In other words, that surface of the inorganic LED which faces the organic material has the form of a photonic crystal or is patterned in the manner of a photonic crystal. An LED having a surface formed in this way is described for example in the document WO2006/131087 the disclosure content of which in this regard is hereby expressly incorporated by reference.

The further layers are expediently produced by means of deposition methods such as vapor deposition methods and vacuum sublimation, such that the surface profile of the photonic crystal is thereby transferred to the further layers and produces the DFB resonator coordinated with the organic laser.

In accordance with a further advantageous configuration, the emission wavelength of the inorganic LED is coordinated with the absorption band of the laser-active organic material. This coordination has the effect that the excitation energy of the inorganic LED is deposited in the laser-active organic material.

Further advantageous configurations of the invention provide for the laser resonator to have a deep grating structure having a gradient in the modulation period. Such a laser resonator is described for example in the document "A nearly diffraction limited surface emitting conjugated polymer laser utilizing a two-dimensional photonic band structure, S. Riechel et al., Applied Physics Letters, Volume 77, Number 15, pp 2310-2312", the disclosure content of which with regard to the laser described therein is hereby incorporated by reference. This embodiment enables the production of tunable laser sources in which the emission wavelength varies spatially over the chip area. In order to improve the beam quality of the organic lasers, it is also expedient to implement the modulation in a plurality of spatial directions, for example as a square or hexagonal grating.

In accordance with an alternative embodiment, small modulation depths can also be chosen. These have the effect that the effective distributed resonator extends over the entire chip area and monomode diffraction-limited and coherent emission can thus be generated. A corresponding laser resonator is described for example in the document "Very compact tunable solid-state laser utilizing a thin-film organic semiconductor, S. Riechel et al., Optics Letters, Vol. 26, No. 9, pp 593-595", the disclosure content of which with regard to the laser described therein is hereby incorporated by reference.

The patterning of the organically laser-active material for producing the laser resonator can be effected mechanically or optically/chemically depending on the embodiment.

With regard to the method for producing an organic semiconductor laser comprising an organic laser-active layer and a laser resonator, the object is achieved by virtue of the fact that an electrically operable inorganic LED is provided with organic layers composed of laser-active material.

The further layers such as, for example, a transparent separation layer or the organic layer composed of laser-active material are advantageously applied to the inorganic LED by deposition methods.

The laser resonator is produced by patterning the organic layer, which is expediently effected mechanically for example by means of a stamp or optically/chemically.

The patterning of the laser resonator can also be effected by means of a patterning of the pump source. If, by way of example, the further layers are applied to a patterned surface of the inorganic LED, the structure of the laser resonator is thus automatically produced at the surface of the organic layer.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is explained in more detail below on the basis of exemplary embodiments illustrated in the drawings, in which.

DETAILED DESCRIPTION OF THE DRAWINGS

Figure 1:
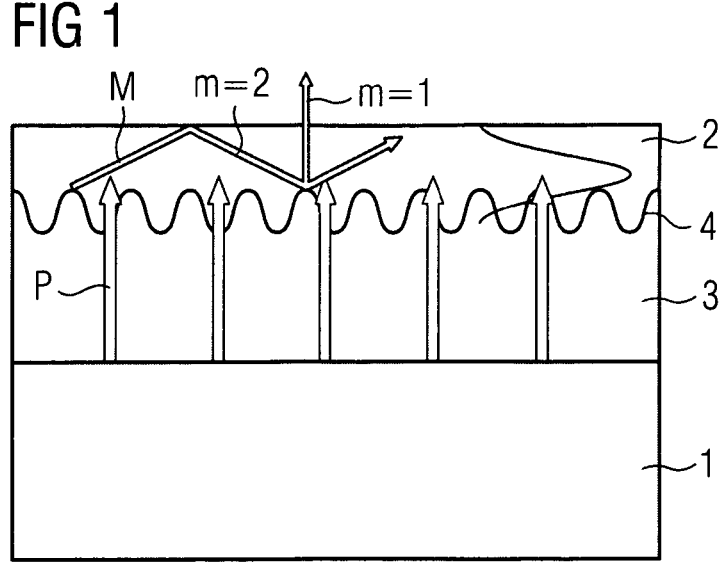
FIG. 1 shows a schematic construction of the organic semiconductor laser according to the invention.

FIG. 1 shows the basic construction of the organic semiconductor laser according to an embodiment of the invention.

A conventional inorganic LED 1 is provided with a layer composed of organic laser-active material 2. During electrical operation of the inorganic LED 1, light is emitted from the surface into the layer composed of organic laser-active material 2. Said layer composed of organically laser-active material can comprise a plurality of organic layers or films.

A transparent separation layer 3 is arranged between the inorganic LED 1 and the layer composed of organic laser-active material 2. Said separation layer 3 enables a lossless coupling of the photons from the inorganic LED into the active organic material.

On account of the difference in refractive index between inorganic crystals (n>2) and organic materials (n<2), the separation layer is of great importance for the mode guiding. The separation layer 3, which has a lower refractive index than the active organic material 2, enables, on account of the difference in refractive index, an efficient decoupling of the laser mode from the inorganic LED, such that the laser mode is guided primarily in the active organic material and experiences the optical amplification there.

By way of example, the separation layer consists of or comprises a plastic material such as, for example, polyethylene terephthalate (PET).

The separation layer is of central importance, but not a mandatory part of the invention.

In terms of its layer thickness, the active organic material is formed in such a way that a guided mode can propagate in the organic film.

In order to form a laser resonator 4, a surface of the organic laser-active material is not plane but rather patterned in such a way that, at the period elevations, part of the guided laser mode is reflected in a plane and a distributed so-called DFB (DFB—distributed feedback) resonator is formed.

The inorganic LED 1 emits so-called pump light P for the excitation of the laser-active organic material 2.

Said pump light P penetrates through the transparent separation layer 3 and impinges on the laser resonator 4.

The mode M arising in the organically laser-active material is diffracted at the structure of the laser resonator 4, such that one part of the mode m=2 is reflected and the formation of a standing wave is generated by the feedback.

The other part m=1 forms the emitted laser light, which is emitted perpendicular to the surface in the case of the second-order DFB resonator illustrated here.

In the case of the exemplary embodiment in accordance with FIG. 1, the DFB structure, that is to say the DFB resonator, is formed at the interface between separation layer 3 and laser-active material 2.

In accordance with an exemplary embodiment that is not illustrated, the DFB structure can likewise also be provided at the top side of the laser-active material 2.

The DFB structure can also be formed as a first-order DFB resonator, the laser radiation then being emitted from the edge, that is to say laterally. A significant advantage of the first-order DFB resonators is a reduction of the laser threshold on account of low coupling-out losses.

Figure 2:
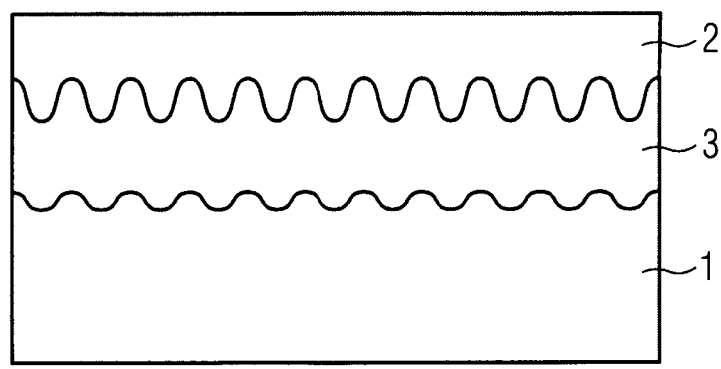
FIG. 2 shows the basic construction from FIG. 1 with a roughened surface of the inorganic LED, and FIG. 3 likewise shows the basic construction from FIG. 1 with formation of the surface of the inorganic LED in a photonic crystal structure.

FIG. 2 shows an alternative embodiment of the laser source according to the invention. In this case, the inorganic LED 1 is provided with a roughened surface. A roughened surface of the inorganic LED increases the external efficiency. This may be attributable for example to the fact that the probability of total reflection of the radiation emerging from the inorganic LED is reduced on account of the roughening.

In this case, the separation layer 3 can simultaneously also be used as a planarization layer.

Coating processes, such as spin-coating or blade coating, are preferably suitable for applying the separation layer 3.

In said coating processes, the desired materials are dissolved in solvents and then processed from the liquid phase.

The conceptual approach of producing the DFB resonator or laser resonator 4 either at the interface between the separation layer 3 and the laser-active material 2 or at the surface of the organic laser-active material 2 remains unaffected by the planarization.

Figure 3:
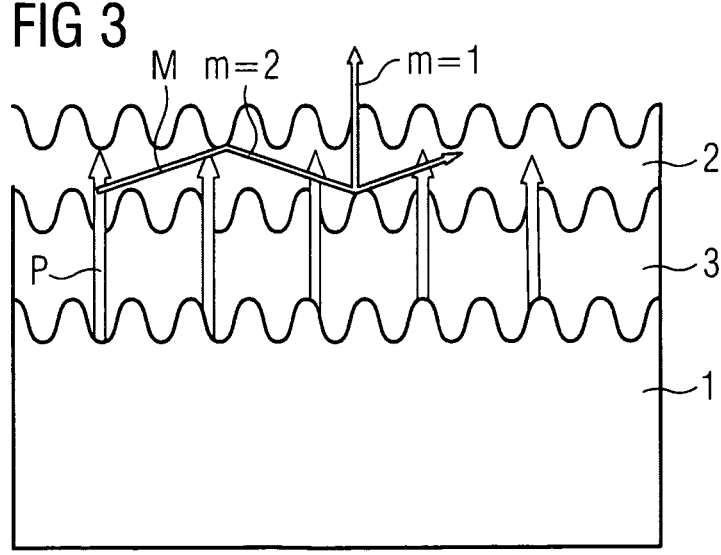

FIG. 3 shows a further embodiment of the invention.

In the case of this embodiment in accordance with FIG. 3, the surface of the inorganic LED is formed in the form of a photonic crystal in order to increase the coupling out of light. Given a suitable photonic crystal structure of the surface, that is to say the suitable formation of the grating period and the modulation depth, the photonic crystal brings about a significant increase in the coupling-out efficiency and directionality of the LED.

Given the choice of suitable deposition methods for the further layers such as, for example, vapor deposition methods and vacuum sublimation, the surface profile at the surface of the inorganic LED in the form of the photonic crystal is transferred to the further layers and thus produces the DFB resonator coordinated with the organic layer.

As a result of applying the further layers to the surface of the inorganic LED in the form of a photonic crystal structure, the DFB resonator is thus produced automatically at the top side or underside of the organically laser-active layer 2.

In all of the embodiments it is expedient if the emission wavelength of the inorganic LED is coordinated with the absorption band of the laser-active organic material such that the excitation energy of the inorganic LED is deposited in the active material.

In all three embodiments, the coupling length and thus the effective resonator length varies depending on the modulation depth of the periodic structure.

If, by way of example, deep grating structures having a gradient in the modulation period are used, tunable laser sources are possible in which the emission wavelength varies spatially over the chip area.

In order to improve the beam quality of the organic lasers, it is appropriate to implement the modulation in a plurality of spatial directions, for example as a square or hexagonal grating.

Small modulation depths, by contrast, have the effect that the effective distributed resonator extends over the entire chip area such that monomode diffraction-limited and coherent emission can be generated.

The patterning of the surface of the inorganic LED or of the organically laser-active layer for forming the resonator can be effected as described above by applying further layers to a photonic crystal structure or mechanically or optically/chemically.

The following further methods are mentioned by way of example:
  impression methods, for example by means of a stamp,
  modification of the optical properties, for example holographic exposure, in which either the active material or the separation layer is locally crosslinked and thus becomes locally inert toward solvent (phototechnology),
  holographic exposure in which the optical properties of the material are locally modified, which is accompanied by a change in the refractive index,
  arrangement of nanoparticles of suitable size, for example by self-assembly.

The invention as represented by the exemplary embodiments in accordance with FIGS. 1 to 3 makes it possible to produce a space-saving and cost-effective laser source. Owing to the variability in the selection of the organic material and the laser resonator geometry, on the basis of this invention it is possible to generate laser emission at a freely selectable wavelength in the entire visible spectral range. Consequently, the invention is of central importance both for spectroscopic and for display applications.

The invention is not restricted by the description on the basis of the exemplary embodiments. Rather, the invention encompasses any new feature and also any combination of features, which in particular comprises any combination of features in the patent claims, even if this feature or this combination itself is not explicitly specified in the patent claims or exemplary embodiments.

We claim:

1. An organic semiconductor laser comprising a layer composed of organically laser-active material and a laser resonator, wherein
  an optical pump source is integrally connected to the organic semiconductor laser, the optical pump source being an electrically operated inorganic LED;
  a surface of the inorganic LED has the form of a photonic crystal; and
  a surface profile of the surface of the inorganic LED is transferred to the layer composed of organically laser-active material to form the laser resonator.

2. The organic semiconductor laser as claimed in claim 1, in which the laser resonator is formed by patterning a surface of the organically laser-active material.

3. The organic semiconductor laser as claimed in claim 1, in which the organically laser-active material is separated from the inorganic LED by a separation layer.

4. The organic semiconductor laser as claimed in claim 3, in which the laser resonator is formed at an interface layer between the separation layer and the organically laser-active material.

5. The organic semiconductor laser as claimed in claim 1, in which a surface of the inorganic LED which faces the layer composed of organically laser-active material is formed in roughened fashion.

6. The organic semiconductor laser as claimed in claim 3, in which the separation layer forms a planarization layer.

7. The organic semiconductor laser as claimed in claim 6, in which the planarization layer is applied by coating processes such as spin-coating or blade coating.

8. The organic semiconductor laser as claimed in claim 1, in which the laser resonator is formed as a DFB resonator.

9. The organic semiconductor laser as claimed in claim 1, in which the emission wavelength of the pump source is coordinated with the absorption band of the organically laser-active material.

10. The organic semiconductor laser as claimed in claim 1, in which the laser resonator has a deep grating structure having a gradient in the modulation period.

11. The organic semiconductor laser as claimed in claim 1, in which the laser resonator is embodied with a periodic structure in a plurality of spatial directions.

12. The organic semiconductor laser as claimed in claim 1, in which the laser resonator is formed with a small modulation depth.

13. The organic semiconductor laser as claimed in claim 1, in which a patterning of the laser resonator is effected at least one of mechanically, optically, and chemically.

14. The organic semiconductor laser as claimed in claim 1, in which the laser resonator is embodied with a periodic structure in a plurality of spatial directions of a square or hexagonal grating.

15. An organic semiconductor laser comprising a layer composed of organically laser-active material and a laser resonator, wherein
  an optical pump source is integrally connected to the organic semiconductor laser, the optical pump source being an electrically operated inorganic LED;
  the organically laser-active material is separated from the inorganic LED by a separation layer;

inorganic crystals of the inorganic LED have a refractive index of n>2;

the organically laser-active material has an refractive index of n<2;

the separation layer has a lower refractive index than the organically laser-active material;

a surface of the inorganic LED has the form of a photonic crystal; and a surface profile of the surface of the inorganic LED is transferred to the layer composed of organically laser-active material to form the laser resonator.

16. The organic semiconductor laser as claimed in claim 15, in which the laser resonator is formed at an interface layer between the separation layer and the organically laser-active material.

* * * * *